INVENTOR.
William C. Moeller
BY
ATTORNEYS

3,068,751
SPECTACLE ASSEMBLY
William C. Moeller, Kansas City, Mo., assignor to Parmelee Plastics Company, Kansas City, Mo., a corporation of Missouri
Filed June 29, 1959, Ser. No. 823,405
1 Claim. (Cl. 88—47)

This invention relates to the manufacture of spectacle assemblies and has for its primary object the provision of an improved means of attachment of an ornamental molding to a lens-supporting band, this being a continuation-in-part of my copending application Serial No. 695,688, filed November 12, 1957, now abandoned.

In my copending application above-identified, there is disclosed an improved lens-supporting band of a spectacle frame having novel means for holding the lens seated and secured within the band which included also, structure for attaching the temple bow thereto.

It is the most important object of the present invention to utilize the fastener for the lens-supporting band as a means of holding the ornamental molding in place across the band between the nasal and temporal sides thereof.

In carrying out the principles of the instant invention there is provided a frame broadly designated by the numeral 10, including a pair of lens-supporting bands 12 interconnected at the nasal side thereof by a suitable bridge 14 in the usual manner and having conventional nose pads 16 suitably secured thereto at said nasal side of the bands 12.

Figure 1:
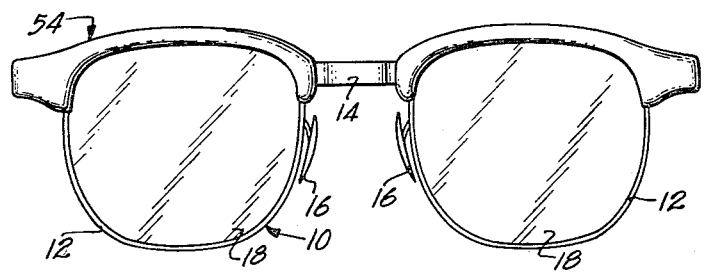
FIG. 1 is a front elevational view of a spectacle assembly made pursuant to the present invention.
Figure 2:
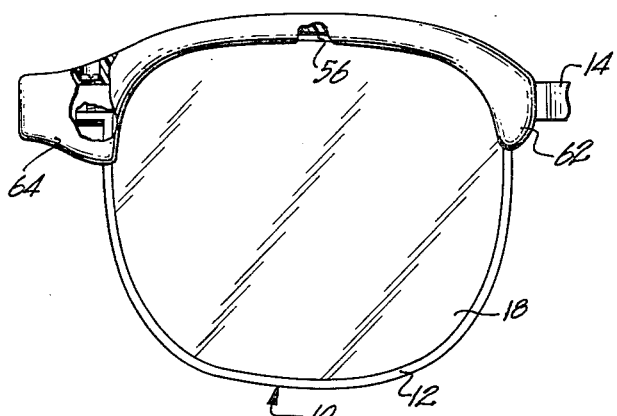
FIG. 2 is a fragmentary, enlarged front elevational view showing one of the lenses and its associated components, parts being broken away and in section for clearness.
Figure 5:
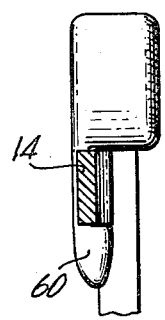
FIG. 5 is a fragmentary, cross-sectional view still further enlarged, taken on line 5—5 of FIG. 3.
Figure 3:
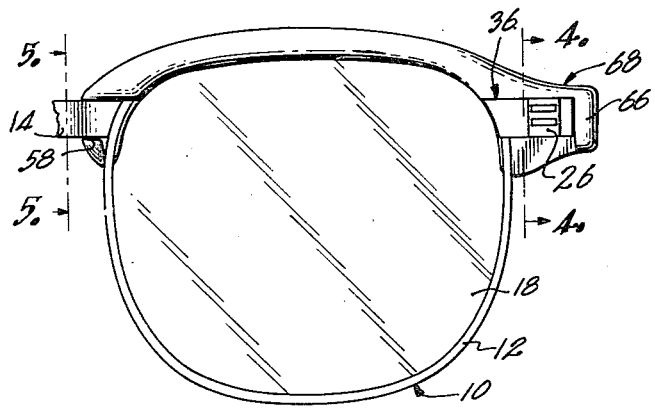
FIG. 3 is a fragmentary, rear elevational view of one of the lenses and its components.

The bands 12 mount and surround lenses 18 and there may be provided any suitable type of temple bows (not shown) attached to the bands 12 through the medium of hinges, each of which is provided with a pair of relatively articulated straps, one of such straps being attached to the corresponding temple bow. Strap 26 for one of such hinges is illustrated in FIGS. 3 and 4.

Each band 12 is made from a single length of initially straight material, preferably metallic, having a longitudinal groove 28 throughout the length thereof. The peripheral edge of the lens 18 is formed complementally with the groove 28 whereby to seat positively therein, and band 12 is of course, bent and formed pursuant to the peripheral configuration of the lens 18 whereby to surround the latter.

Band 12 is provided with an upper and a lower connector 30 and 32 respectively, integral with the adjacent ends thereof, it being noted that the temporal side of the band 12 is split, presenting a space 34 between the connectors 30 and 32.

Figure 4:
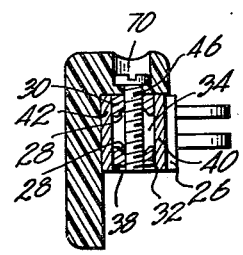
FIG. 4 is a cross-sectional view still further enlarged, taken on line 4—4 of FIG. 3.

Connectors 30 and 32 are relatively superimposed and extend outwardly beyond the band 12 substantially within the plane of the latter and, therefore, the grooves 28 thereof are in facing relationship as shown in FIG. 4.

A U-shaped support for the hinge straps 26 is broadly designated by the numeral 36 and includes a bight 38, an inner leg 40, and an outer leg 42, the faces of all three components 38, 40 and 42 of the support 36 being substantially vertical. It is noted that support 36 is disposed in embracing relationship to the connectors 30 and 32 completely housing the same, and to this end, it is noted that the ends of the connectors 30 and 32 are in abutting relationship to the inner face of bight 38.

Connectors 30 and 32 span the distance between the legs 40 and 42, connector 30 thereby closing the rectangular opening that would otherwise be presented at the top of support 36. Connector 30 is attached rigidly to the components 38, 40 and 42 of support 36 as by brazing. It is preferred however, that the legs 40 and 42 extend at their terminal ends in overlapping relationship to the band 12. Leg 40 of support 36 presents a rearwardly-facing, vertical surface to which the strap 26 of the hinge is firmly affixed, again as by brazing or the like.

Connector 32 is free to move within the support 36 between the legs 40 and 42 thereof and toward and away from the connector 30 to the end that the lens 18 may be quickly and easily removed and inserted. A fastener for detachably uniting the connectors 30 and 32 preferably takes the form of a screw 46, connector 30 having an opening therein for clearing the screw 46 and the connector 32 being provided with a tapped opening into which the screw 46 is threaded.

Proper clamping of the band 12 about the lens 18 can only be assured if the connectors 30 and 32 are not in interengagement prior to the band 12 firmly engaging the lens 18 throughout the peripheral length of the latter. Consequently, it is to be preferred that when lens 18 is fully clamped within the groove 28, connectors 30 and 32 be spaced apart as at 34.

Each band has an ornamental molding 54 extending therealong between the bridge member 14 and its connectors 30 and 32. In fact, the molding 54 overlies its band 12 and has a channel 56 receiving the same. While the channel 56 terminates at the uppermost edges of the legs 40 and 42 of the support 36, it continues at the opposite end of the molding 54 beyond the lowermost edge of the bridge member 14 as best seen in FIG. 3. A notch 58 in the molding 54 and traversing the channel 56, receives or clears the bridge member 14, presenting therefore, a hook 60 in the molding 54 that is partially looped around the bridge member 14.

An enlargement 62 on the outer face of the molding 54 adjacent the bridge 14, partially covers the latter, as well as a portion of the band 12.

At the opposite end of the molding 54 there is also presented an enlargement 64 that covers and hides from view the entire outer face of the support 36, i.e., all of the leg 42.

An end wall 66 forming a part of the enlargement 64 covers the bight 38 of support 36, and a plateau 68 constituting a continuation of the top face of the molding 54 covers the connector 30, as well as the upper edges of the legs 40 and 42.

A counterbored hole 70 in the molding 54, extending downwardly from the plateau 68, receives the fastener 46 whereby the latter unites the molding 54 with the connectors 30 and 32. It can be seen therefore, that fastener 46 cooperates with the hook 60 in releasably attaching the molding 54 to the frame 10. Lateral movement of the molding 54 is prevented by virtue of the channel 56 and upward movement of the inner end of the molding 54 is prevented because of the way in which the hook 60 engages beneath the lower edge of the bridge member 14.

Manifestly, the fastener 46 restrains the outer end of the molding 54 against movement in any direction. Fastener 46 serves therefore, as the only means at the outer end of the molding 54 for holding the latter against upward movement away from connector 30 and the upper edges of legs 40 and 42. Notch 58 is sufficiently deep to accommodate the thickness of the bridge member 14 and, if desired, as shown, the bridge member 14 may be offset outwardly intermediate the ends thereof between the two enlargements 62, one for each molding 54 respectively.

Having thus described the invention what is claimed as new and desired to be secured by Letters Patent is:

In a spectacle frame, the combination of a lens-supporting band of metallic material having a pair of ends proximal to the temporal side thereof; a horizontally disposed bridge member secured to the band at the nasal side thereof; upper and lower connectors on the ends of the band and provided with aligned openings therethrough, the openings in said lower connector being internally threaded; an ornamental molding extending along the top of the band between the bridge member and said upper connector and provided with a channel therein complementally receiving the band, said molding having a laterally extending portion at one extremity thereof in overlying engagement with the upper connector and an enlargement integral with said portion at the normally front side of the latter and depending therefrom in covering relationship to said connectors when the latter are in operative positions with said band supporting said lens, said molding being provided with an enlarged opposite extremity extending below said bridge member, said portion having an opening therethrough in alignment with the openings in said connectors, the axis of said opening being in a plane spaced rearwardly from the plane of said enlargement, said opposite extremity having a notch therein in the normally rear side thereof transverse to said channel and complementally receiving said bridge member, there being a projecting portion on said opposite extremity in underlying relationship to and in engagement with said bridge member to maintain said opposite extremity mounted on said bridge member when said band is received within said channel; a screw freely shiftable through the opening in said one extremity and said upper connector and threadably mounted in said lower connector, said screw being provided with a head and said opening in said one extremity having a shoulder spaced below the upper surface of said molding, said head being in engagement with said shoulder and spaced below said upper surface, whereby said one extremity of said molding is secured to said connectors and said opposite extremity thereof is hooked on said bridge member to maintain said molding in a fixed position relative to said band with the screw being concealed by said portion and said enlargement.

References Cited in the file of this patent

UNITED STATES PATENTS

| | | |
|---|---|---|
| 2,703,036 | Splaine | Mar. 1, 1955 |
| 2,711,671 | Cook | June 28, 1955 |
| 2,752,820 | Lindblom | July 3, 1956 |
| 2,832,260 | De Angelis et al. | Apr. 29, 1958 |
| 2,946,258 | Lindblom | July 26, 1960 |

FOREIGN PATENTS

| | | |
|---|---|---|
| 13,484 | Germany | Sept. 6, 1956 |